March 15, 1932.  A. E. TURNER  1,850,040
DEVICE FOR PREVENTING THEFT OF GAS
Filed March 26, 1930
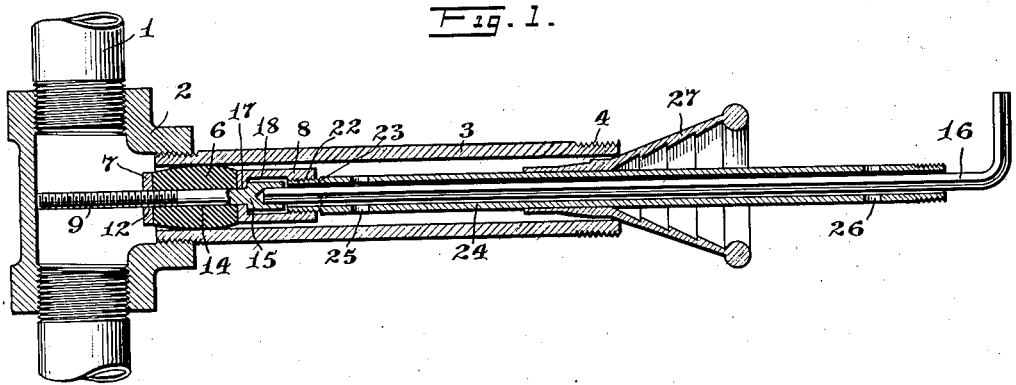
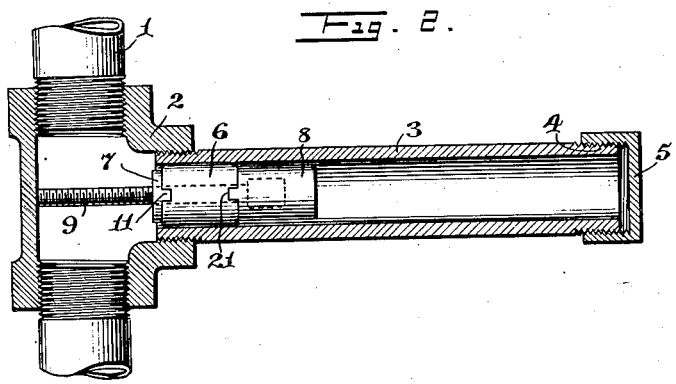
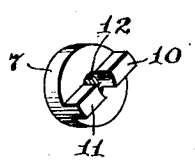
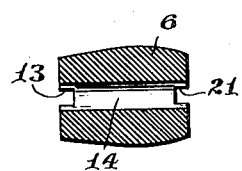
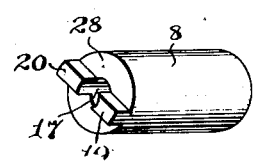
WITNESSES
INVENTOR
Alfred E. Turner
BY
ATTORNEYS Patented Mar. 15, 1932

1,850,040

UNITED STATES PATENT OFFICE

ALFRED E. TURNER, OF NEW YORK, N. Y., ASSIGNOR TO CONSOLIDATED GAS COMPANY OF NEW YORK, OF NEW YORK, N. Y., A CORPORATION OF NEW YORK

DEVICE FOR PREVENTING THEFT OF GAS

Application filed March 26, 1930. Serial No. 439,109.

This invention relates to gas appliances and particularly to an improved device for preventing the theft of gas, the object being to provide a comparatively simple and yet effective structure which will close the outlet to the gas pipe in such a manner that it will be impossible or difficult to steal the gas therefrom.

Another object of the invention is to provide an expansible plug for outlet pipes from gas mains, the plug being formed to radially expand when placed within a pipe and thereby shut off the flow of gas through the pipe.

A further object of the invention is to provide a plug for shutting off the gas and an improved arrangement of operating means for applying and removing the plug.

In the accompanying drawings—

Figure 1 is a sectional view through a supply pipe and an outlet pipe, together with an embodiment of the invention;

Figure 2 is a view similar to Figure 1 with the actuating tools or members removed and a sealing cap substituted;

Figure 3 is an enlarged detail perspective view of a tension washer embodying certain features of the invention;

Figure 4 is a longitudinal, sectional view through the plug or stopper disclosing certain features of the invention;

Figure 5 is an enlarged perspective view of a locking sleeve embodying certain features of the invention.

Referring to the accompanying drawings by numerals, 1 indicates a supply pipe having a T-joint 2 of the usual construction. The T-member 2 carries a distributing or outlet pipe 3 which is provided with threads 4 on the upper end. Whenever desired a pipe or other device can be connected to the threaded end 4 so as to supply gas to any desired outlet. When this is not necessary or desirable a cap 5 is screwed on to the threaded section 4 to seal the pipe against the discharge of gas.

As far as holding the gas against leakage is concerned the cap 5 is entirely satisfactory, but it has been found that sometimes unauthorized persons will remove the cap 5 and secure a supply of gas in an unauthorized manner.

To prevent this theft of gas an expansible plug or stopper 6 has been provided, together with certain other devices as shown more particularly in Figure 1.

Associated with the plug 6 is a tension washer 7, together with an actuating sleeve and a threaded rod 9. The washer 7, as shown in Figure 3, is provided with a pair of lugs 10 and 11 and a threaded aperture 12. This washer 7 is adapted to screw on to the threaded rod 9, and the lugs 10 and 11 are adapted to be fitted into the respective notches 13 in the stopper or pug 6.

The stopper or plug 6 may be made of rubber or other suitable resilient material, and is provided with a longitudinal bore or passageway 14 to accommodate the rod 9. Rod 9 at one end is provided with a head 15 having a squared socket therein for accommodating the end of the squared tool or actuating rod 16. Sleeve 8 is provided with an aperture 17 merging into the inner chamber 18 and with lugs 19 and 20 adapted to fit into the respective notches 21 in the stopper 6. Sleeve 8 is provided with a threaded section 22 adapted to receive threaded section 23 of the tube 24.

The tube 24 is preferably threaded on both ends so that either end may be screwed into section 22. This tube is also provided with apertures 25 and 26 whereby a rod or other instrument may be inserted and used as a lever to turn the tube when the same is being screwed into place. Tool 16 may be used for this purpose if desired.

In order to prevent any appreciable amount of leakage of gas when the parts are being assembled a resilient cone-shaped stopper 27 may be employed. This is slidably mounted on the tube 25 and is adapted to be pressed against the end of the pipe 3 while tube 24 is being rotated, and also while tool 16 is being rotated for expanding the stopper 6.

After cap 5 has been removed the parts are quickly forced into the position shown in Figure 1, and as soon as the rod 9 touches the rear wall of the fitting 2 the instrument 16 is rotated for expanding the stopper 13 until it assumes substantially the position shown in Figure 2. Plug 6 is held against rotation by friction and consequently as rod 9 rotates the tension washer or nut 7 will gradually move along rod 9 and thus expand the stopper.

It will be noted that the head 15 of rod 9 interlocks with the bottom 28 of sleeve 8, thus preventing any outward movement of the parts while the stopper is being expanded.

After the stopper 6 has been expanded to the desired extent, tube 24 is unscrewed and this tube together with the instrument 16 and stopper or closure 27 are all removed. The cap 5 is then placed and the parts left in that condition, which is clearly shown in Figure 2.

If the device should be left in place for many years there will be no leakage because the cap 5 will prevent such leakage even if the rubber stopper 6 deteriorates.

After the parts have been arranged as shown in Figure 2 is will be very difficult to see whether or not the plug is in place, and consequently an unauthorized person removing cap 5 will be puzzled as to why the gas does not escape. If an unauthorized person should remove cap 5 and then try to remove the stopper 13, it will be very difficult for him to succeed because he will not be prepared with the special tools necessary to coact with the sleeve 8 and with the head 15. In this way theft of gas is prevented and yet the pipe is left in condition to be used at any time when an authorized person removes the stopper.

What I claim is:

1. A closure device for a pipe comprising an expansible plug adapted to be placed wholly within a pipe, said plug having a passageway therethrough and being notched at each end, said plug having a less diameter than its length, means acting as abutments arranged at each end of said plug, said means having projections extending into the respective notches of said plug, a rod adapted to be positioned wholly within said pipe, said rod extending through said abutments and said passageway, said rod being threaded for part of its length, one of said abutments acting as a travel nut so that when said rod is rotated it will move, so that when the rod is rotated in one direction the plug will be expanded by being squeezed between said abutments, and when the rod is rotated in the other direction said plug will be released, and the other of said abutments having a tubular portion provided with a threaded section adapted to receive a holding tube.

2. A closure device for a pipe comprising a stopper adapted to be inserted wholly into a pipe, and means for expanding and holding the stopper in the pipe, said means including a rod having an enlarged head provided with a squared socket and with a threaded section, an actuating sleeve surrounding part of said rod and abutting against said head, a tension washer acting as a nut surrounding the threaded section of said rod, whereby when an instrument is inserted into said squared socket and rotated in one direction said tension washer will be moved towards the actuating sleeve and the stopper will be squeezed until it expands radially against said pipe, said actuating sleeve acting as a washer against which said stopper is forced by said tension washer and as means for receiving a supporting tube whereby the supporting tube may hold the sleeve and associated parts in position while said rod is being rotated.

3. A closure device for a pipe comprising an expansible plug of rubber adapted to be inserted wholly into a pipe, said plug having a passageway therethrough and a notch at each end, an actuating sleeve having a projection fitting into one of said notches, a tension washer acting as a travel nut, said tension washer being provided with an extension fitting into the other of said notches, a rod having a tool receiving head interlocking with said actuating sleeve, said rod extending through said plug and said tension washer whereby when said rod is rotated in one direction said tension washer will be moved toward said actuating sleeve for expanding said plug, said sleeve being provided with threads for receiving a tube adapted to hold the sleeve and associated parts in position while said rod is being rotated and as a guide for the tool engaging said head.

4. A closure device for a pipe comprising an expansible stopper having a greater length than its diameter and formed with a passageway extending therethrough longitudinally, a threaded rod extending through said passageway and substantially fitting the same, opposing means acting as abutments carried by said rod and interlocking with the ends of said stopper, one of said means acting as a traveling nut so that when said rod is rotated, it will move along the rod for squeezing the stopper against the opposite abutment, and thereby expand the stopper radially against the interior walls of said pipe, said rod at one end having an outwardly facing tool receiving portion, said opposite abutment surrounding said tool receiving portion and presenting a guide for a tool adapted to be inserted into said tool receiving portion, said threaded rod and means acting as abutments being positioned wholly within the pipe when in use.

Signed at New York city, in the county of New York, and State of New York this 22 day of March, 1930, A. D.

ALFRED E. TURNER.